United States Patent
Ghosh

(10) Patent No.: US 11,212,039 B2
(45) Date of Patent: Dec. 28, 2021

(54) ACKNOWLEDGMENT MANAGEMENT TECHNIQUES FOR UPLINK MULTI-USER TRANSMISSIONS

(71) Applicant: INTEL CORPORATION, Santa Clara, CA (US)

(72) Inventor: Chittabrata Ghosh, Fremont, CA (US)

(73) Assignee: INTEL CORPORATION, Santa Clara, CA (US)

( * ) Notice: Subject to any disclaimer, the term of this patent is extended or adjusted under 35 U.S.C. 154(b) by 326 days.

(21) Appl. No.: 15/399,678

(22) Filed: Jan. 5, 2017

(65) Prior Publication Data

US 2017/0195086 A1 Jul. 6, 2017

Related U.S. Application Data

(60) Provisional application No. 62/275,159, filed on Jan. 5, 2016.

(51) Int. Cl.
*H04L 5/00* (2006.01)
*H04L 1/16* (2006.01)

(52) U.S. Cl.
CPC .......... *H04L 1/1685* (2013.01); *H04L 1/1671* (2013.01); *H04L 5/0055* (2013.01)

(58) Field of Classification Search
CPC .... H04L 1/1685; H04L 1/1671; H04L 5/0055
See application file for complete search history.

(56) References Cited

U.S. PATENT DOCUMENTS

| | | | | |
|---|---|---|---|---|
| 7,948,991 B1* | 5/2011 | Hart | ...................... | H04L 1/1854 370/395.4 |
| 2012/0021784 A1* | 1/2012 | Meunier | .................. | H04W 4/14 455/466 |
| 2015/0288501 A1* | 10/2015 | Kwon | ................... | H04L 1/1614 370/329 |
| 2015/0365940 A1* | 12/2015 | Chu | ....................... | H04L 5/0094 370/329 |
| 2016/0127020 A1* | 5/2016 | Abraham | .............. | H04L 1/1829 370/312 |

(Continued)

OTHER PUBLICATIONS

Stacey, Robert, "IEEE 802.11-15/0132r13, Specification Framework for TGax", Nov. 2015, 38 pages.

*Primary Examiner* — Brandon M Renner
(74) *Attorney, Agent, or Firm* — Kacvinsky Daisak Bluni PLLC

(57) ABSTRACT

Acknowledgment management techniques for UL MU transmissions are described. In various embodiments, an AP may observe a limit with respect to a number of TIDs for which corresponding A-MPDUs are to be acknowledged in a given immediate/compressed multi-user (MU) block ACK (BA). In some embodiments, the AP may indicate such a TID limit in a broadcast transmission, such as a beacon or management frame. In various other embodiments, the AP may indicate such a TID limit in a response for a capability request, such as a Probe Response, or in a specific allocation frame, such as a trigger frame, for all STAs participating in UL MU transmissions. In various embodiments, a single TID limit may be indicated that is understood to apply to each STA. In some other embodiments, the AP may indicate a respective TID limit for each of multiple STAs. Other embodiments are described and claimed.

19 Claims, 11 Drawing Sheets

(56) References Cited

U.S. PATENT DOCUMENTS

2016/0128024 A1* 5/2016 Frederiks ............. H04W 72/04
                                                370/329
2017/0048048 A1* 2/2017 Seok ................. H04L 5/0055
2017/0078003 A1* 3/2017 Ghosh ................ H04W 74/04
2017/0111951 A1* 4/2017 Chu .................. H04L 1/1671

* cited by examiner

| More Frag. =1 | Sequence Number 1 | MSDU Fragment Number 0 | More Frag. =1 | Sequence Number 1 | MSDU Fragment Number 1 |

...

| More Frag. =0 | Sequence Number 1 | MSDU Fragment Number 9 |

| SOP = 1 | EOP = 0 | Sequence Number 1 | MSDU Fragment Number 0 |

...

| SOP = 0 | EOP = 1 | Sequence Number 10 | MSDU Fragment Number 9 |

*FIG. 9*

Storage Medium 900

*Computer Executable Instructions for 800*

ACKNOWLEDGMENT MANAGEMENT TECHNIQUES FOR UPLINK MULTI-USER TRANSMISSIONS

RELATED CASE

This application claims priority to U.S. Provisional Patent Application No. 62/275,159, filed Jan. 5, 2016, which is hereby incorporated by reference in its entirety.

TECHNICAL FIELD

Embodiments described herein generally relate to wireless communications between devices in wireless networks.

BACKGROUND

In IEEE 802.11 Task Group ax (TGax), a discussion is ongoing regarding scheduled medium access using OFMDA, according to which a scheduling message such as a trigger frame from an AP may indicate the STA ID, assigned sub-channels, and duration of access. The IEEE 802.11ax Specification Framework Document (SFD) specifies a trigger frame that synchronizes STAs prior to their UL traffic transmission. The designated STAs with assigned resources (sub-channels) indicated in the trigger frame transmit their UL data after SIFS time of trigger frame transmission. Following the UL traffic, after the SIFS, the SFD mentions that there shall be a control frame sent by the AP that acknowledges the UL data using a block ACK.

BRIEF DESCRIPTION OF THE DRAWINGS

FIG. 3 illustrates an embodiment of a first fragmentation scheme.
FIG. 4 illustrates an embodiment of a second fragmentation scheme.
FIG. 9 illustrates an embodiment of a second storage medium.

DETAILED DESCRIPTION

Figure 1:
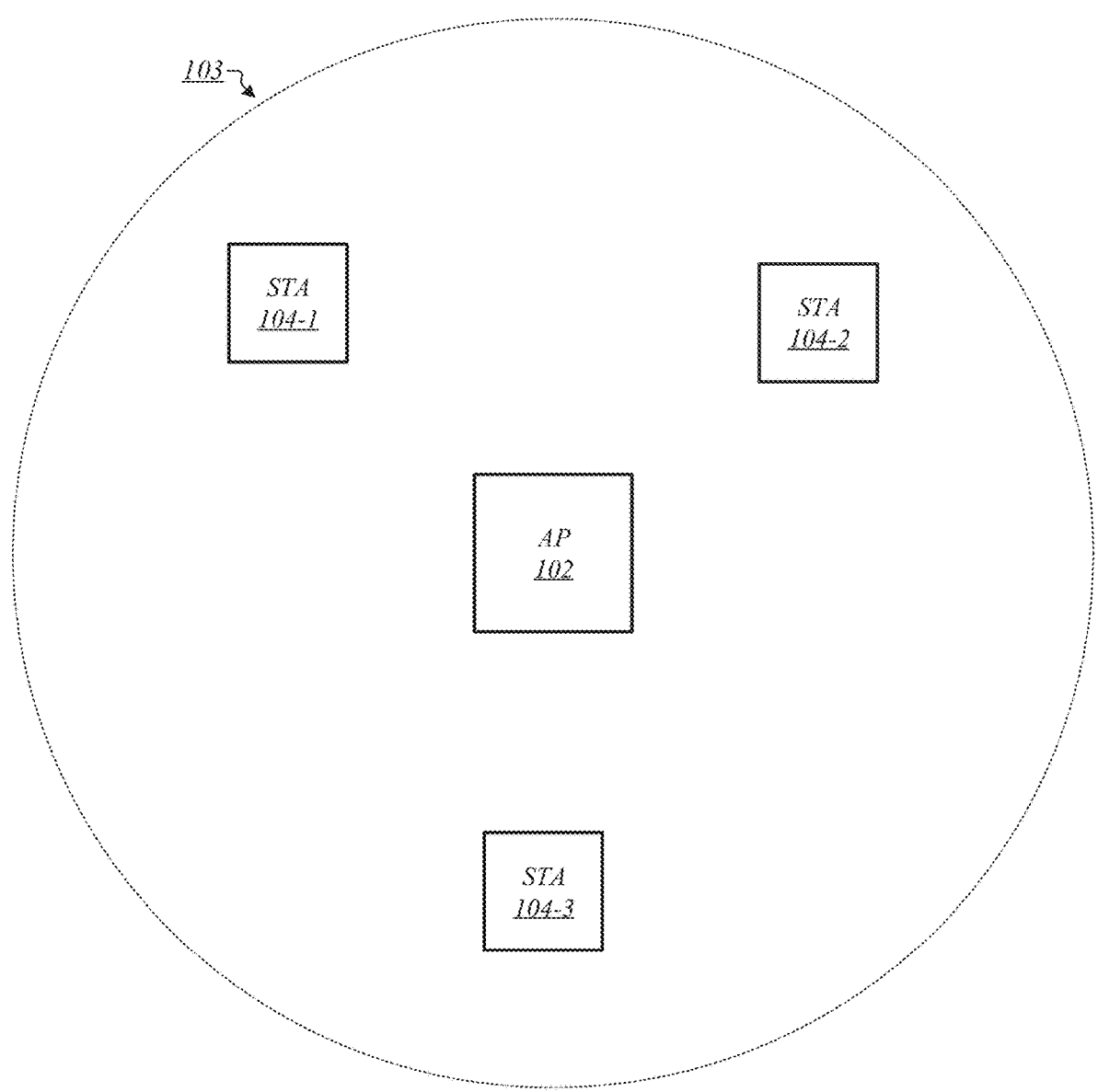
FIG. 1 illustrates an embodiment of a first operating environment.

Various embodiments may be generally directed to acknowledgment management techniques for UL MU transmissions. According to various such techniques, an AP may observe a limit with respect to a number of TIDs for which corresponding A-MPDUs are to be acknowledged in a given immediate/compressed multi-user (MU) block ACK (BA). In some embodiments, the AP may indicate such a TID limit in a broadcast transmission, such as a beacon or management frame. In various embodiments, the AP may indicate such a TID limit in a response for a capability request, such as a Probe Response. In some embodiments, the AP may indicate such a TID limit in a specific allocation frame, such as a trigger frame, for all STAs participating in UL MU transmissions. In various embodiments, a single TID limit may be indicated that is understood to apply to each STA. In some other embodiments, the AP may indicate a respective TID limit for each of multiple STAs. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Embodiments herein are generally directed to wireless communications systems. Various embodiments are particularly directed to wireless communications performed according to one or more wireless communications standards. Some embodiments may involve wireless communications performed according to High-Efficiency Wi-Fi standards developed by the IEEE 802.11 High Efficiency WLAN (HEW) Study Group. Various embodiments may involve wireless communications performed in accordance with an Institute of Electrical and Electronics Engineers (IEEE) 802.11ax standard. Some embodiments may involve wireless communications performed in accordance with the DensiFi Specification Framework Document (SFD). The embodiments are not limited in this context.

Some embodiments may additionally or alternatively involve wireless communications according to one or more other wireless communication standards. Examples of other wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11ah, and/or IEEE 802.11ay standards, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above.

Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/ or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

FIG. 1 illustrates an example of an operating environment 100 such as may be representative of various embodiments. In operating environment 100, an access point 102 may generally manage access to the wireless medium in a wireless local area network (WLAN) 103. In some embodiments, stations (STAs) 104-1, 104-2, and 104-3 may associate with AP 102 in order to join WLAN 103. In various embodiments, joining WLAN 103 may enable STAs 104-1 to 104-3 to wirelessly communicate with each other via AP 102. In some embodiments, in order to send data to a recipient STA, a sending STA may transmit an uplink (UL) physical layer convergence procedure (PLCP) protocol data unit (PPDU) comprising the data to AP 102, which may then send the data to the recipient STA in a downlink (DL) PPDU. In various embodiments, in conjunction with managing access to the wireless medium in WLAN 103, AP 102 may schedule medium access for the sending STA during a UL time interval, during which AP 102 may refrain from transmitting over the wireless medium. In some embodiments, the UL time interval may comprise a portion of a transmit opportunity (TXOP) owned by AP 102. The embodiments are not limited in this context.

In various embodiments, at a given point in time, multiple STAs in WLAN 103 may wish to send data. In some embodiments, rather than scheduling medium access for such STAs in different respective UL time intervals, it may be desirable that AP 102 schedule medium access for such STAs in such a way as to support UL multi-user (MU) transmission techniques, according to which multiple STAs may transmit UL MU PPDUs to AP 102 simultaneously during a given UL time interval. For example, using UL MU orthogonal frequency division multiple access (OFDMA) techniques during a given UL time interval, multiple STAs may transmit UL MU PPDUs to AP 102 via different respective OFDMA resource units (RUs) allocated by AP 102. In another example, using UL MU multiple-input multiple-output (MU-MIMO) techniques during a given UL time interval, multiple STAs may transmit UL MU PPDUs to AP 102 via different respective spatial streams allocated by AP 102. The embodiments are not limited in this context.

Figure 2:
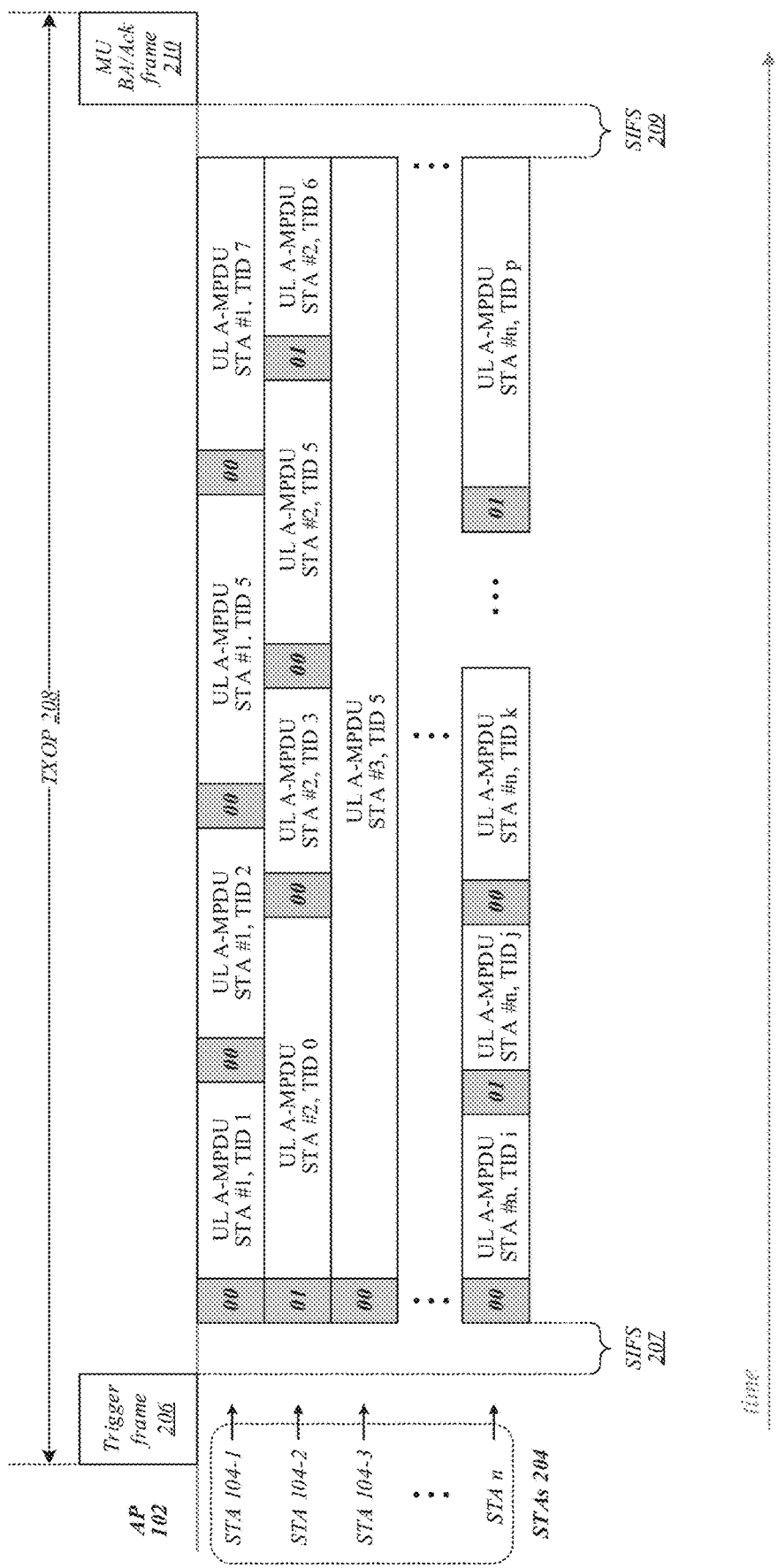
FIG. 2 illustrates an embodiment of a first communications flow.

FIG. 2 illustrates an example of a communications flow 200 that may be representative of various embodiments. In communications flow 200, AP 102 transmits a trigger frame 206 in order to notify a plurality of STAs—including STAs 104-1, 104-2, and 104-3 of FIG. 1—that it has allocated resources for their use in conjunction with UL MU transmission to AP 102 during a portion of a TXOP 208 owned by AP 102. This plurality of STAs is collectively labeled as STAs 204 in FIG. 2. In some embodiments, the allocated resources may comprise different respective OFDMA RUs via which STAs 204 are to transmit UL MU PPDUs to AP 102. In various other embodiments, the allocated resources may comprise different respective spatial streams via which STAs 204 are to transmit UL MU PPDUs to AP 102. The embodiments are not limited in this context.

In various embodiments, in response to trigger frame 206, STAs 204 may initiate UL transmission to AP 102. In some embodiments, STAs 204 may initiate UL transmission to AP 102 following a short interframe space (SIFS) 207. In various embodiments, following completion of the UL transmission on the part of STAs 204, AP 102 may transmit a multi-user (MU) block acknowledgment (BA)/acknowledgment (Ack) frame 210 to acknowledge receipt of some or all of the UL transmissions of STAs 204. In some embodiments, upon completion of the UL transmissions of STAs 204, AP 102 may wait for a SIFS 209 before transmitting MU BA/Ack frame 210. The embodiments are not limited in this context.

In the example of FIG. 2, each of STAs 204 transmits one or more aggregate medium access control (MAC) protocol data units (A-MPDUs) to AP 102. Each A-MPDU that a given one of STAs 204 transmits comprises data associated with a particular traffic identifier (TID) for that STA, and for each A-MPDU, a corresponding Ack Policy subfield (shaded in grey) is set to a value of either '00' or '01'. For example, STA 104-1 transmits A-MPDUs associated with TIDs 1, 2, 5, and 7, and for each such A-MPDU, the Ack Policy subfield is set to '00'. In various embodiments, AP 102 may use MU BA/Ack frame 210 to acknowledge some or all of the A-MPDUs transmitted by STAs 204. In some embodiments, MU BA/Ack frame 210 may comprise an immediate or compressed MU-BA.

In various embodiments, for any given one of STAs 204, AP 102 may observe a limit with respect to the number of TIDs for which corresponding A-MPDUs may be acknowledged in any given MU BA/Ack frame such as MU BA/Ack frame 210. In some embodiments, such a TID limit may apply to acknowledgments provided using immediate or compressed MU-BAs. In various embodiments, AP 102 may notify STAs 204 of such a TID limit by including indications in any or all of one or more types of frames/messages that it may transmit in conjunction with wireless communications with STAs 204. In a first example, in some embodiments, AP 102 may indicate such a TID limit in a broadcast transmission, such as a beacon or management frame. In a second example, in various embodiments, AP 102 may indicate such a TID limit in a response for a capability request, such as a Probe Response. In a third example, in some embodiments, AP 102 may indicate such a TID limit in a specific allocation frame (such as trigger frame 206) for all STAs participating in UL MU transmissions. In various embodiments, a single TID limit may be indicated that is understood to apply to each STA. In some other embodiments, AP 102 may indicate a respective TID limit for each of multiple STAs. In various such embodiments, the respective TID limits may be indicated in a specific allocation frame (such as trigger frame 206) for all STAs participating in UL MU transmissions. For example, in trigger frame 206, AP 102 may indicate a plurality of TID limits, including a first TID limit that applies to STA 104-1, a second TID limit that applies to STA 104-2, and a third TID limit that applies to STA 104-3. The embodiments are not limited to these examples.

In some embodiments, the TID limit(s) to be observed in conjunction with the construction of MU BA/Ack frame 210 may be negotiated. In various embodiments, any given one of STAs 204 may negotiate a TID limit with AP 102 during association with AP 102. In some embodiments, any given one of STAs 204 may negotiate a TID limit with AP 102 during traffic stream (TS) establishment/modification. In various embodiments, any given one of STAs 204 may negotiate a TID limit with AP 102 upon an instance of another type, such as a link condition change. The embodiments are not limited to these examples.

In some embodiments, any given one of STAs 204 may set the Ack Policy subfield of an A-MPDU to a value of '01' in order to specify that MU BA/Ack frame 210 should include an acknowledgment associated with that A-MPDU. In various embodiments, in conjunction with setting the values of the Ack Policy subfields of the A-MPDUs that it transmits, such a STA may take an applicable TID limit into account. In some embodiments, a given STA that is not implementing MAC service data unit (MSDU) fragmentation may set the values of the Ack Policy subfields of its transmitted A-MPDUs in accordance with a constraint specifying that the number of A-MPDUs for which Ack Policy='01' may not exceed the applicable TID limit. For example, based on an applicable TID limit of 2, STA 104-2 may set the Ack Policy subfields of its first and fourth transmitted A-MPDUs to '01', but may set the Ack Policy subfields of its second and third transmitted A-MPDUs to '00'. The embodiments are not limited to this example.

FIG. 3 illustrates an example of an MSDU fragmentation scheme 300 that may be representative of various embodiments. For example, MSDU fragmentation scheme 300 may be representative of a first scheme according to which a given one of STAs 204 of FIG. 2 may fragment an MSDU for transmission to AP 102. As shown in FIG. 3, according to MSDU fragmentation scheme 300, an MSDU may be partitioned into a plurality of fragments, each of which may be associated with a same sequence number (SN). In the example depicted in FIG. 3, the MSDU is partitioned into ten fragments—MSDU fragment numbers (FNs) 0 to 9—each of which is associated with SN 1. It is worthy of note that in some embodiments, MSDU fragmentation scheme 300 may be applied to fragment an MSDU into less than ten fragments or more than ten fragments, and the embodiments are not limited to the example depicted in FIG. 3.

In various embodiments, in conjunction with implementation of MSDU fragmentation scheme 300, a given STA may only be permitted to include one MSDU fragment in any given A-MPDU that it transmits. In some embodiments, if a STA is able to use a set of A-MPDUs to convey all of the MSDU fragments associated with a given TID in transmitting a UL PPDU, it may set Ack Policy equal to '01' for each of the set of A-MPDUs. In various embodiments, if the STA cannot include all of the MSDU fragments associated with the given TID in the UL PPDU, it may set Ack Policy equal to '00' for each of the set of A-MPDUs, to indicated delayed ACK/BA. In some embodiments, the delayed ACK/BA may allow the AP to wait to receive the remaining MSDU fragments associated with the TID. In various embodiments, in conjunction with implementation of MSDU fragmentation scheme 300, the total number of TIDs from which MSDU fragments are aggregated in A-MPDUs with Ack Policy equal to '01' may not be permitted to exceed the applicable TID limit. The embodiments are not limited in this context.

FIG. 4 illustrates an example of an MSDU fragmentation scheme 400 that may be representative of some embodiments. For example, MSDU fragmentation scheme 400 may be representative of a second scheme according to which a given one of STAs 204 of FIG. 2 may fragment an MSDU for transmission to AP 102. As shown in FIG. 4, according to MSDU fragmentation scheme 400—as according to MSDU fragmentation scheme 300 of FIG. 3—an MSDU may be partitioned into a plurality of fragments. However, according to MSDU fragmentation scheme 400, each such fragment may be associated with a different SN. In the example depicted in FIG. 4, the MSDU is partitioned into ten fragments—MSDU FNs 0 to 9—each one of which is associated with a respective one of SNs 1 to 10. It is worthy of note that in various embodiments, MSDU fragmentation scheme 400 may be applied to fragment an MSDU into less than ten fragments or more than ten fragments, and the embodiments are not limited to the example depicted in FIG. 4.

In some embodiments, in conjunction with implementation of MSDU fragmentation scheme 400, a STA may be permitted to set different Ack Policy values for different MSDU fragments associated with a same TID. In various embodiments, in conjunction with implementation of MSDU fragmentation scheme 400, the total number of TIDs from which MSDU fragments are aggregated in A-MPDUs with Ack Policy equal to '01' may not be permitted to exceed the applicable TID limit. The embodiments are not limited in this context.

Figure 5:
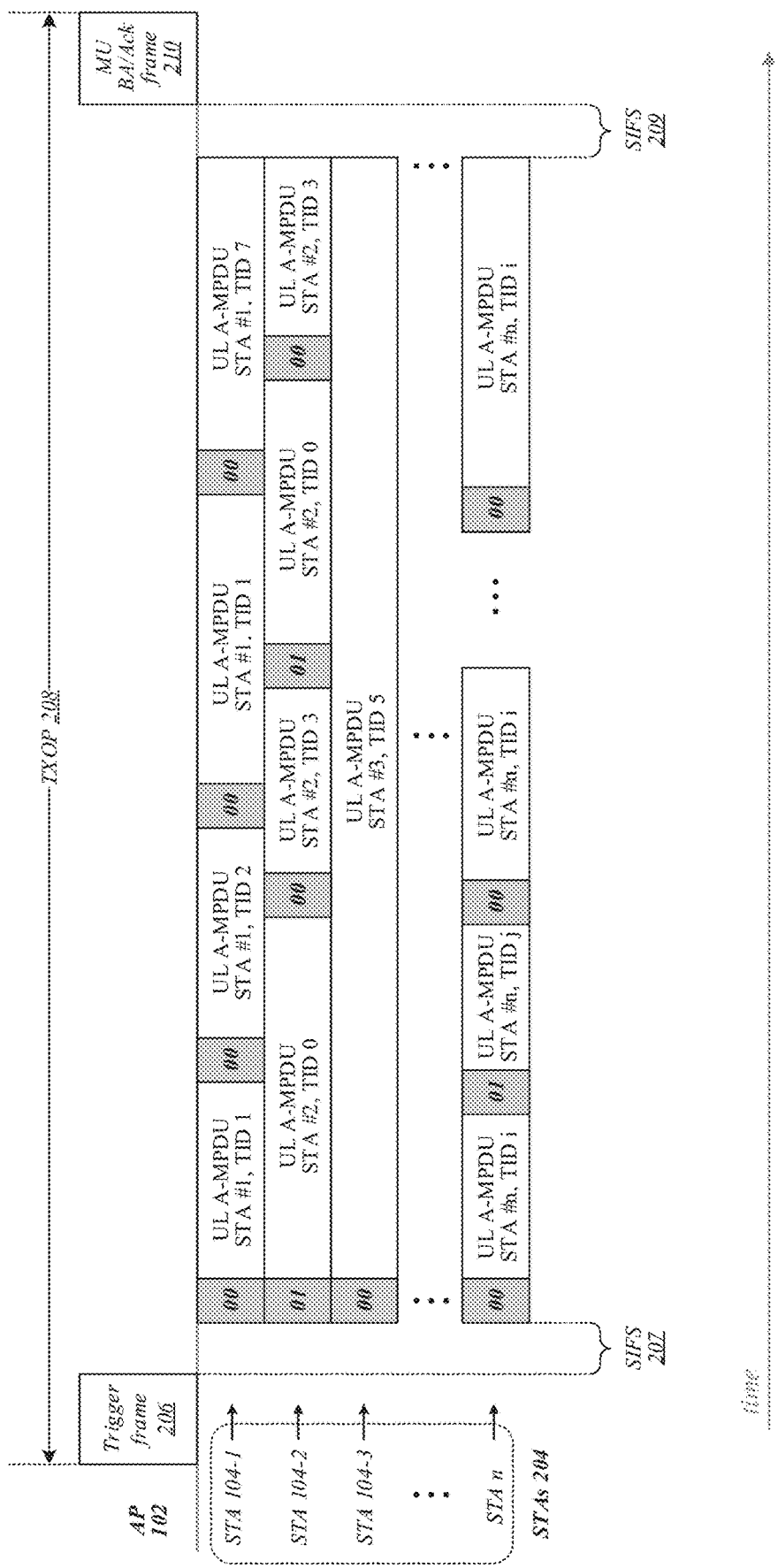
FIG. 5 illustrates an embodiment of a second communications flow.

In some embodiments, any given STA may be permitted to interlace MSDUs associated with a given TID into multiple A-MPDUs within an UL PPDU. In various embodiments, any two A-MPDUs comprising MSDUs associated with a same TID may be adjacent or may be separated by one or multiple other A-MPDUs. In the example communications flow 500 of FIG. 5, STA 104-1 interlaces multiple A-MPDUs comprising MSDUs associated with TID 1, STA 104-2 interlaces multiple A-MPDUs comprising MSDUs associated with TID 0 and interlaces multiple A-MPDUs comprising MSDUs associated with TID 3, and STA n interlaces multiple A-MPDUs comprising MSDUs associated with TID i. In some embodiments, such interlacing on the part of any given one of STAs 204 may be representative of a scenario in which MSDUs that are initially present in a FIFO queue and that are associated with a given TID are prepared as MPDUs in an initial A-MPDU and MSDUs that subsequently arrive into the FIFO queue and that are associated with that same TID are subsequently aggregated into one or more additional A-MPDUs. In various embodiments, any STA that interlaces MSDUs associated with a given TID into multiple A-MPDUs within an UL PPDU may be required to set the Ack Policy subfield for each such A-MPDU to a same value. For example, according to communications flow 500, STA 104-1 may be required to set the Ack Policy subfields for its first and third A-MPDUs—both of which may comprise MSDUs associated with TID 1—to a same value, which in the example depicted in FIG. 5 is '00'. The embodiments are not limited in this context.

Figure 6:
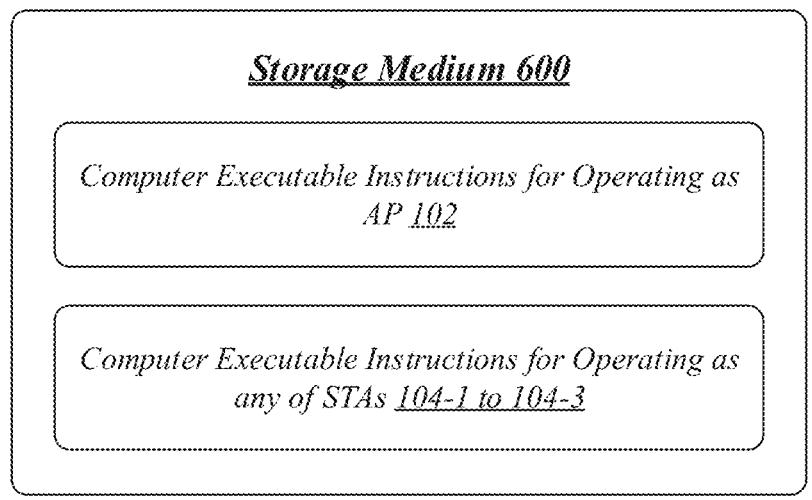
FIG. 6 illustrates an embodiment of a first storage medium.

FIG. 6 illustrates an embodiment of a storage medium 600. Storage medium 600 may comprise any non-transitory computer-readable storage medium or machine-readable storage medium, such as an optical, magnetic or semiconductor storage medium. In various embodiments, storage medium 600 may comprise an article of manufacture. In some embodiments, storage medium 600 may store computer-executable instructions, such as computer-executable instructions to implement AP 102 and/or computer-executable instructions to implement any of STAs 104-1 to 104-3. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 7:
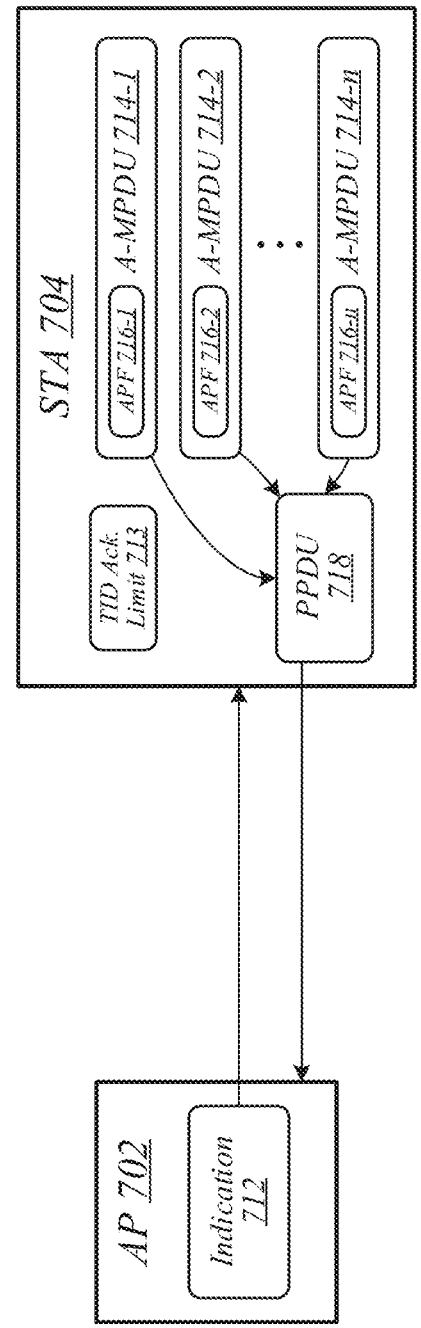
FIG. 7 illustrates an embodiment of a second operating environment.

FIG. 7 illustrates an operating environment 700 that may be representative of the implementation of one or more of the disclosed acknowledgment management techniques for UL MU transmissions according to various embodiments. In operating environment 700, a STA 704 may generate a set of A-MPDUs 714-1 to 714-$n$ for transmission to an AP 702 during a UL transmission interval. In some embodiments, A-MPDUs 714-1 to 714-$n$ may comprise respective acknowledgment policy fields 716-1 to 716-$n$. In various embodiments, the UL transmission interval may comprise a portion of a transmit opportunity (TXOP) owned by AP 702. In some embodiments, STA 704 may be the same as or similar to any of STAs 104-1 to 104-3. In various embodiments, AP 702 may be the same as or similar to AP 102. In some embodiments, STA 704 may identify the UL transmission interval and generate A-MPDUs 714-1 to 714-$n$ for transmission to AP 702 based on an allocation frame received from AP 702. For example, in various embodiments, STA 704 may identify the UL transmission interval based on a received Trigger frame such as Trigger frame 206, and may generate A-MPDUs 714-1 to 714-$n$ for transmission in response to receipt of that Trigger frame. The embodiments are not limited to this example.

In some embodiments, in preparation for transmission of A-MPDUs 714-1 to 714-$n$, STA 704 may identify a TID acknowledgment limit 713. TID acknowledgment limit 713 may generally comprise a limit on a number of different TIDs that may be represented within A-MPDUs for which STA 704 requests immediate acknowledgment among those transmitted during a given UL transmission interval. In various embodiments, TID acknowledgment limit 713 may comprise a STA-specific limit, such that it applies specifically to STA 704. In some other embodiments, TID acknowledgment limit 713 may comprise a non-STA-specific limit, such that it applies to each of a set of STAs that are to perform UL transmissions during the UL transmission interval. The embodiments are not limited in this context.

In various embodiments, STA 704 may identify TID acknowledgment limit 713 based on an indication 712 received from AP 702. In some embodiments, indication 712 may be comprised in a beacon frame that STA 704 receives from AP 702. In various embodiments, indication 712 may be comprised in a management frame that STA 704 receives from AP 702. In some embodiments, indication 712 may be comprised in a Probe Response frame that STA 704 receives from AP 702. In various embodiments, indication 712 may be comprised in an allocation message that STA 704 receives from AP 702. In some such embodiments, the allocation message may comprise a Trigger frame, such as one based on which STA 704 may identify the UL transmission interval and generate A-MPDUs 714-1 to 714-$n$ for transmission to AP 702. In various embodiments, the allocation message may indicate an allocation of resources to STA 704 for UL transmissions during the UL transmission interval. In some embodiments, the allocation message to indicate respective allocations of resources for UL transmissions of each of a plurality of STAs during the UL transmission interval. In various embodiments, STA 704 may initiate a negotiation procedure in order to negotiate TID acknowledgment limit 713 with AP 702, and may receive indication 712 from AP 702 during the negotiation procedure. The embodiments are not limited to these examples.

In some embodiments, STA 704 may select one or more of A-MPDUs 714-1 to 714-$n$ as A-MPDUs for which to request immediate acknowledgment. In various embodiments, STA 704 may perform this selection in accordance with TID acknowledgment limit 713. For instance, in some embodiments, STA 704 may select the one or more A-MPDUs to be immediately acknowledged such that the selected set of A-MPDUs is collectively associated with a number of TIDs that does not exceed the TID acknowledgment limit. In various embodiments, STA 704 may set the respective acknowledgment policy fields of the one or more selected A-MPDUs to '01' in order to indicate that immediate acknowledgment of those A-MPDUs is requested.

In some embodiments, STA 704 may aggregate respective sets of MSDUs associated with a same TID within multiple ones of A-MPDUs 714-1 to 714-$n$. In various embodiments, for example, A-MPDUs 714-1 to 714-$n$ may include a first A-MPDU comprising a first aggregated plurality of MSDUs associated with a given TID and a second A-MPDU comprising a second aggregated plurality of MSDUs associated with that TID. In such embodiments, the respective acknowledgment policy fields of the first and second A-MPDUs may be set to match each other. In some such embodiments, the first and second A-MPDUs may comprise consecutive A-MPDUs among the set of A-MPDUs 714-1 to 714-$n$. In various other embodiments, the first and second A-MPDUs may comprise non-consecutive A-MPDUs among the set of A-MPDUs 714-1 to 714-$n$. In some embodiments, STA 704 may encapsulate A-MPDUs 714-1 to 714-$n$ in a physical layer convergence protocol (PLCP) protocol data unit (PPDU) 718 for transmission to AP 702. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 8:
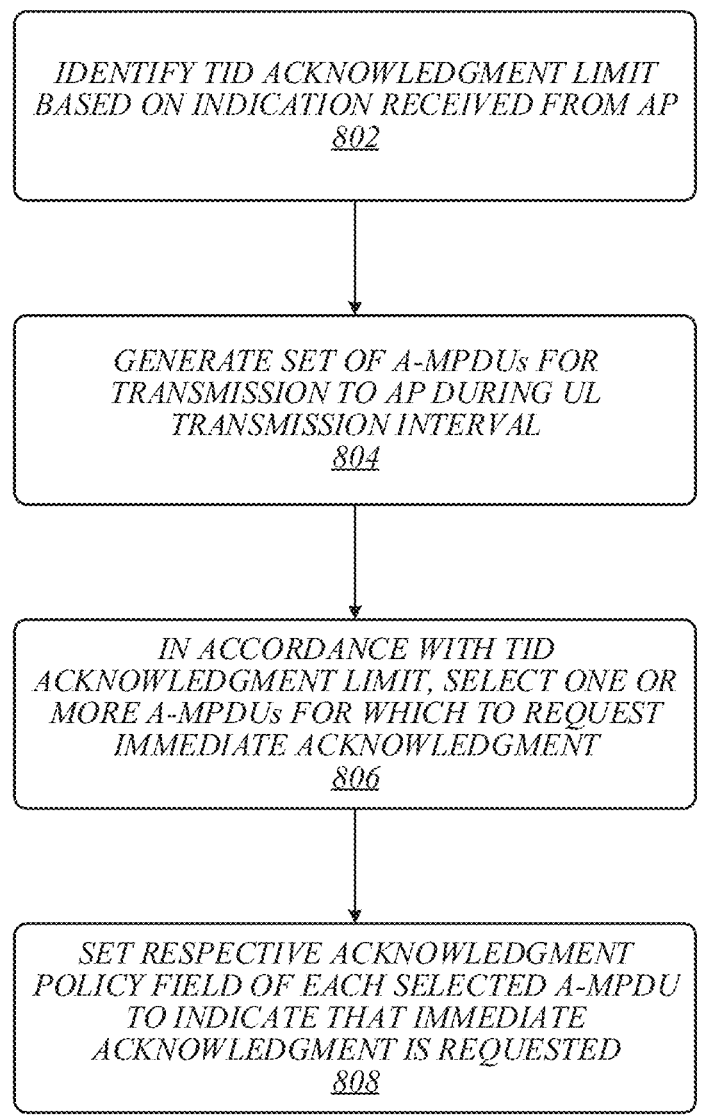
FIG. 8 illustrates an embodiment of a logic flow.

FIG. 8 illustrates a logic flow 800 that may be representative of the implementation of one or more of the disclosed acknowledgment management techniques for UL MU transmissions according to various embodiments. For example, logic flow 800 may be representative of operations that may be performed in some embodiments by STA 704 in operating environment 700 of FIG. 7. As shown in FIG. 8, a TID acknowledgment limit may be identified at 802 based on an indication received from an AP. For example, in operating environment 700 of FIG. 7, STA 704 may be operative to identify TID acknowledgment limit 713 based on an indication 712 received from AP 702.

At 804, a set of A-MPDUs may be generated for transmission to an AP during a UL transmission interval. For example, in operating environment 700 of FIG. 7, STA 704 may be operative to generate a set of A-MPDUs 714-1 to 714-n for transmission to AP 702. At 806, in accordance with the TID acknowledgment limit identified at 802, one or more A-MPDUs may be selected for which to request immediate acknowledgment. For example, in operating environment 700 of FIG. 7, STA 704 may be operative to select one or more of A-MPDUs 714-1 to 714-n as A-MPDUs for which to request immediate acknowledgment, and may do so in accordance with TID acknowledgment limit 713. At 808, a respective acknowledgment policy field of each selected A-MPDU may be set to indicate that immediate acknowledgment of that A-MPDU is requested. For example, in operating environment 700 of FIG. 7, STA 704 may be operative to set the acknowledgment policy fields 716-1 to 716-n such that those corresponding to one or more A-MPDUs selected at 806 indicate that immediate acknowledgment of those one or more A-MPDUs is requested. The embodiments are not limited to these examples.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc. The embodiments are not limited in this context.

FIG. 9 illustrates an embodiment of a storage medium 900. Storage medium 900 may comprise any non-transitory computer-readable storage medium or machine-readable storage medium, such as an optical, magnetic or semiconductor storage medium. In various embodiments, storage medium 900 may comprise an article of manufacture. In some embodiments, storage medium 900 may store computer-executable instructions, such as computer-executable instructions to implement logic flow 800 of FIG. 8. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 10:
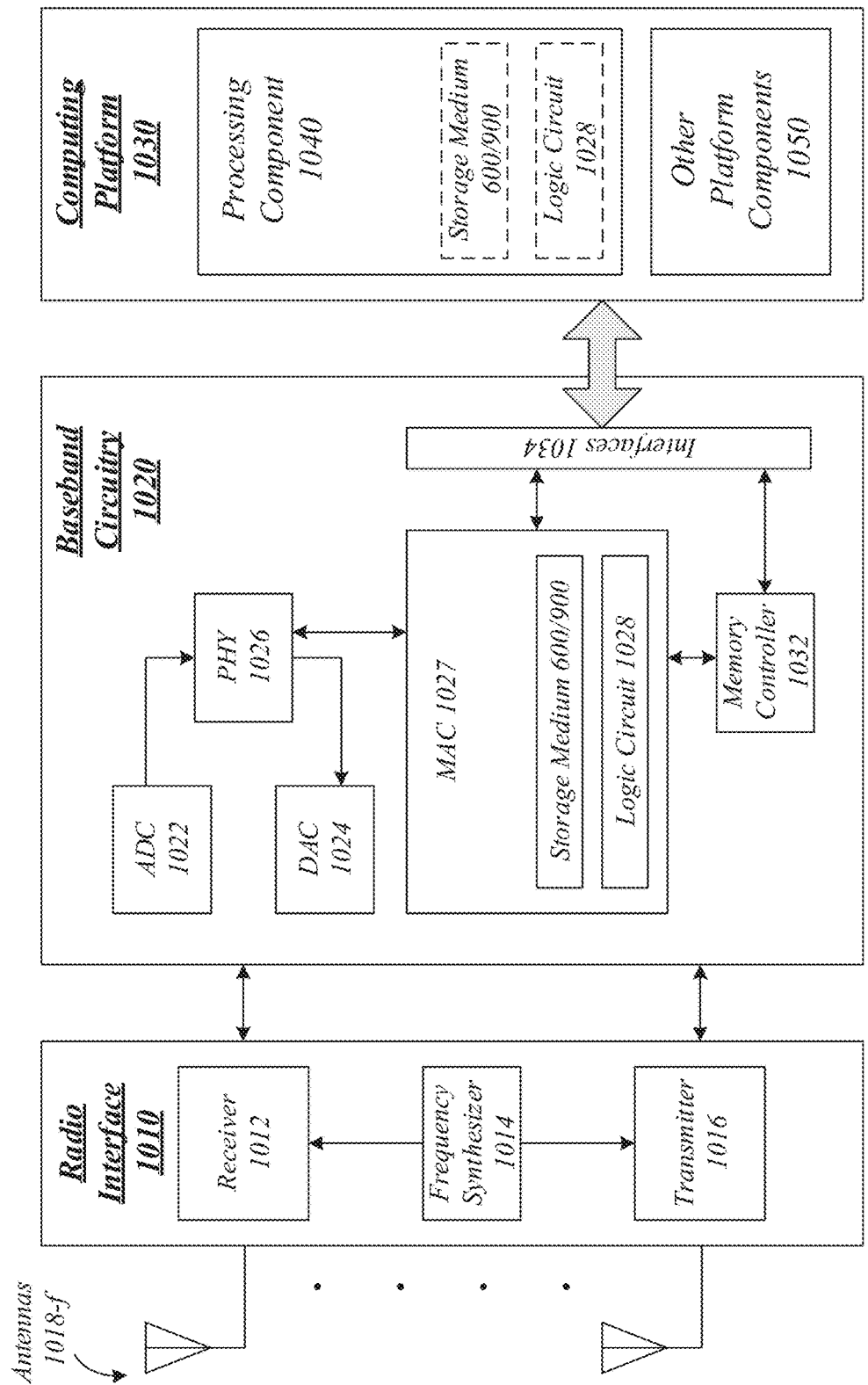
FIG. 10 illustrates an embodiment of a device.

FIG. 10 illustrates an embodiment of a communications device 1000 that may implement one or more of AP 102, STAs 104-1 to 104-3, storage medium 600, AP 702, STA 704, logic flow 800, and storage medium 900. In various embodiments, device 1000 may comprise a logic circuit 1028. The logic circuit 1028 may include physical circuits to perform operations described for one or more of AP 102, STAs 104-1 to 104-3, AP 702, and STA 704, for example. As shown in FIG. 10, device 1000 may include a radio interface 1010, baseband circuitry 1020, and computing platform 1030, although the embodiments are not limited to this configuration.

The device 1000 may implement some or all of the structure and/or operations for one or more of AP 102, STAs 104-1 to 104-3, storage medium 600, AP 702, STA 704, logic flow 800, storage medium 900, and logic circuit 1028 in a single computing entity, such as entirely within a single device. Alternatively, the device 1000 may distribute portions of the structure and/or operations for one or more of AP 102, STAs 104-1 to 104-3, storage medium 600, AP 702, STA 704, logic flow 800, storage medium 900, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018-f. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of AP 102, STAs 104-1 to 104-3, storage medium 600, AP 702, STA 704, logic flow 800, storage medium 900, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-f) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 11:
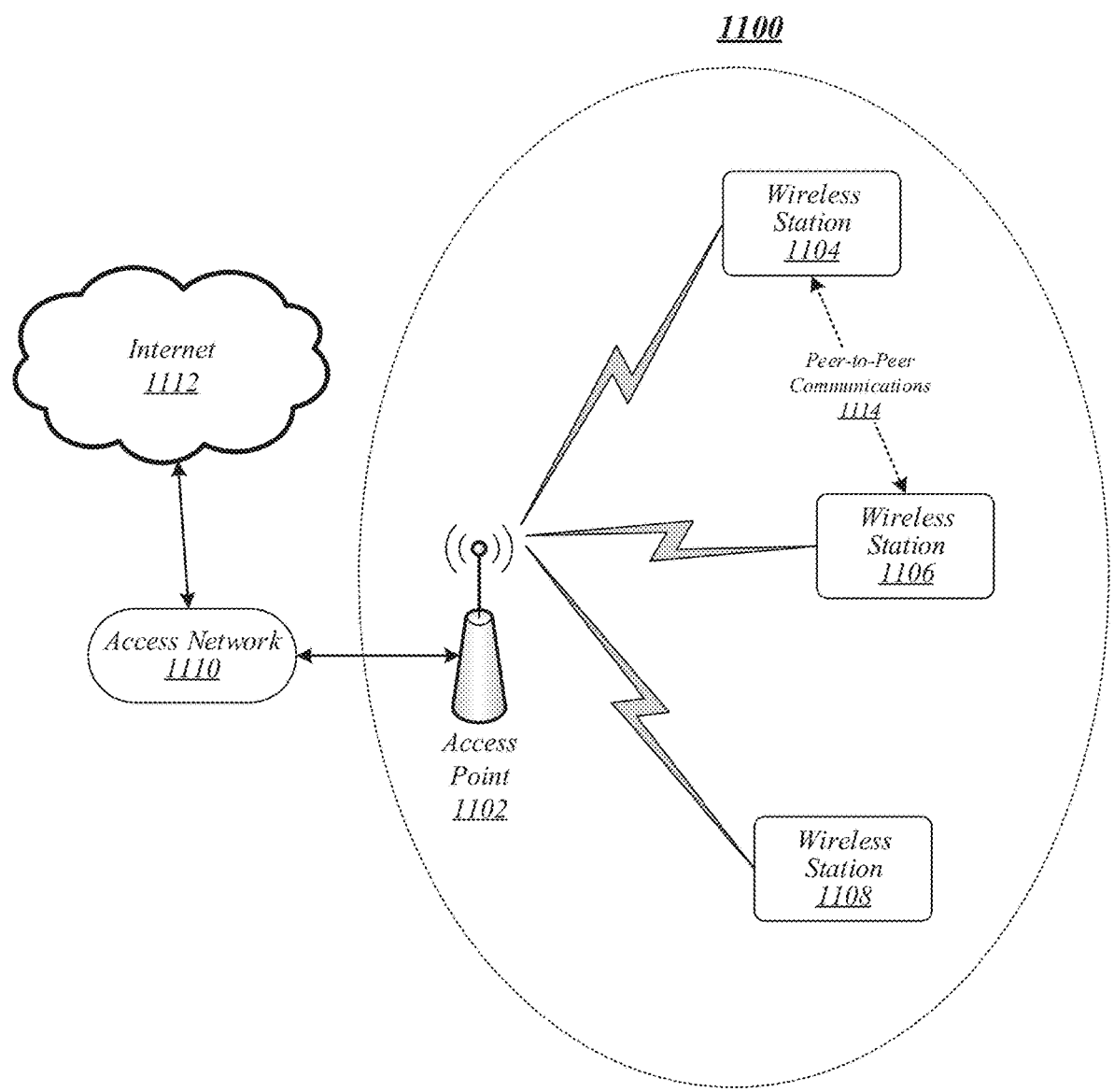
FIG. 11 illustrates an embodiment of a wireless network.

FIG. 11 illustrates an embodiment of a wireless network 1100. As shown in FIG. 11, wireless network comprises an access point 1102 and wireless stations 1104, 1106, and 1108. In various embodiments, wireless network 1100 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1100 may comprise another type of wireless network, and/or may implement other wireless communications standards. In various embodiments, for example, wireless network 1100 may comprise a WWAN or WPAN rather than a WLAN. The embodiments are not limited to this example.

In some embodiments, wireless network 1100 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-14 of LTE/System Architecture Evolution (SAE), and so forth. The embodiments are not limited in this context.

In various embodiments, wireless stations 1104, 1106, and 1108 may communicate with access point 1102 in order to obtain connectivity to one or more external data networks. In some embodiments, for example, wireless stations 1104, 1106, and 1108 may connect to the Internet 1112 via access point 1102 and access network 1110. In various embodiments, access network 1110 may comprise a private network that provides subscription-based Internet-connectivity, such as an Internet Service Provider (ISP) network. The embodiments are not limited to this example.

In various embodiments, two or more of wireless stations 1104, 1106, and 1108 may communicate with each other directly by exchanging peer-to-peer communications. For example, in the example of FIG. 11, wireless stations 1104 and 1106 communicate with each other directly by exchanging peer-to-peer communications 1114. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising a memory, and logic for a station (STA), at least a portion of the logic comprised in circuitry coupled to the memory, the logic to identify a traffic identifier (TID) acknowledgment limit based on an indication received from an access point (AP), generate a set of aggregate medium access control (MAC) protocol data units (A-MPDUs) for transmission to the AP during an uplink (UL) transmission interval, select, from among the set of A-MPDUs, one or more A-MPDUs for which to request immediate acknowledgment, the one or more selected A-MPDUs collectively associated with a number of TIDs that does not exceed the TID acknowledgment limit, and set a respective acknowledgment policy field of each of the one or more selected A-MPDUs to indicate that immediate acknowledgment is requested.

Example 2 is the apparatus of Example 1, the UL transmission interval to comprise a UL multi-user (MU) transmission interval.

Example 3 is the apparatus of any of Examples 1 to 2, the indication comprised in a broadcast transmission received from the AP.

Example 4 is the apparatus of Example 3, the broadcast transmission to comprise a beacon frame.

Example 5 is the apparatus of Example 3, the broadcast transmission to comprise a management frame.

Example 6 is the apparatus of any of Examples 1 to 2, the indication comprised in a Probe Response frame received from the AP.

Example 7 is the apparatus of any of Examples 1 to 2, the indication comprised in an allocation message received from the AP.

Example 8 is the apparatus of Example 7, the allocation message to comprise a Trigger frame.

Example 9 is the apparatus of Example 8, the logic to generate the set of A-MPDUs for transmission to the AP in response to receipt of the Trigger frame.

Example 10 is the apparatus of any of Examples 7 to 9, the allocation message to indicate an allocation of resources to the STA for UL transmissions during the UL transmission interval.

Example 11 is the apparatus of any of Examples 7 to 10, the allocation message to indicate respective allocations of resources for UL transmissions of each of a plurality of STAs during the UL transmission interval.

Example 12 is the apparatus of any of Examples 1 to 11, the logic to initiate a negotiation procedure to negotiate the TID acknowledgement limit with the AP, and receive the indication from the AP during the negotiation procedure.

Example 13 is the apparatus of any of Examples 1 to 12, the TID acknowledgment limit to comprise a STA-specific limit.

Example 14 is the apparatus of any of Examples 1 to 12, the TID acknowledgment limit to comprise a non-STA-specific limit.

Example 15 is the apparatus of any of Examples 1 to 14, the logic to set the respective acknowledgment policy field of each of the one or more selected A-MPDUs to a value of '01' to indicate that immediate acknowledgment is requested.

Example 16 is the apparatus of any of Examples 1 to 15, the set of A-MPDUs to include a first A-MPDU comprising a first aggregated plurality of MAC service data units (MSDUs) associated with a TID, and a second A-MPDU comprising a second aggregated plurality of MSDUs associated with the TID.

Example 17 is the apparatus of Example 16, an acknowledgment policy field for the first A-MPDU to be set to a same value as an acknowledgment policy field for the second A-MPDU.

Example 18 is the apparatus of any of Examples 16 to 17, the first and second A-MPDUs to comprise consecutive A-MPDUs.

Example 19 is the apparatus of any of Examples 16 to 17, the first and second A-MPDUs to comprise non-consecutive A-MPDUs.

Example 20 is the apparatus of any of Examples 1 to 19, the UL transmission interval to comprise a portion of a transmit opportunity (TXOP) owned by the AP.

Example 21 is the apparatus of any of Examples 1 to 20, the logic to encapsulate the set of A-MPDUs in a physical layer convergence protocol (PLCP) protocol data unit (PPDU) for transmission to the AP.

Example 22 is a system, comprising an apparatus according to any of Examples 1 to 21, and at least one radio frequency (RF) transceiver.

Example 23 is the system of Example 22, comprising at least one processor.

Example 24 is the system of any of Examples 22 to 23, comprising at least one RF antenna.

Example 25 is at least one non-transitory computer-readable storage medium comprising a set of instructions that, in response to being executed at a wireless communication device, cause the wireless communication device to identify a traffic identifier (TID) acknowledgment limit based on an indication received from an access point (AP), generate a set of aggregate medium access control (MAC) protocol data units (A-MPDUs) for transmission to the AP during an uplink (UL) transmission interval, select, from among the set of A-MPDUs, one or more A-MPDUs for which to request immediate acknowledgment, the one or more selected A-MPDUs collectively associated with a number of TIDs that does not exceed the TID acknowledgment limit, and set a respective acknowledgment policy field of each of the one or more selected A-MPDUs to indicate that immediate acknowledgment is requested.

Example 26 is the at least one non-transitory computer-readable storage medium of Example 25, the UL transmission interval to comprise a UL multi-user (MU) transmission interval.

Example 27 is the at least one non-transitory computer-readable storage medium of any of Examples 25 to 26, the indication comprised in a broadcast transmission received from the AP.

Example 28 is the at least one non-transitory computer-readable storage medium of Example 27, the broadcast transmission to comprise a beacon frame.

Example 29 is the at least one non-transitory computer-readable storage medium of Example 27, the broadcast transmission to comprise a management frame.

Example 30 is the at least one non-transitory computer-readable storage medium of any of Examples 25 to 26, the indication comprised in a Probe Response frame received from the AP.

Example 31 is the at least one non-transitory computer-readable storage medium of any of Examples 25 to 26, the indication comprised in an allocation message received from the AP.

Example 32 is the at least one non-transitory computer-readable storage medium of Example 31, the allocation message to comprise a Trigger frame.

Example 33 is the at least one non-transitory computer-readable storage medium of Example 32, comprising instructions that, in response to being executed at the wireless communication device, cause the wireless communication device to generate the set of A-MPDUs for transmission to the AP in response to receipt of the Trigger frame.

Example 34 is the at least one non-transitory computer-readable storage medium of any of Examples 31 to 33, the allocation message to indicate an allocation of resources to the STA for UL transmissions during the UL transmission interval.

Example 35 is the at least one non-transitory computer-readable storage medium of any of Examples 31 to 34, the allocation message to indicate respective allocations of resources for UL transmissions of each of a plurality of STAs during the UL transmission interval.

Example 36 is the at least one non-transitory computer-readable storage medium of any of Examples 25 to 35, comprising instructions that, in response to being executed at the wireless communication device, cause the wireless communication device to initiate a negotiation procedure to negotiate the TID acknowledgement limit with the AP, and receive the indication from the AP during the negotiation procedure.

Example 37 is the at least one non-transitory computer-readable storage medium of any of Examples 25 to 36, the TID acknowledgment limit to comprise a STA-specific limit.

Example 38 is the at least one non-transitory computer-readable storage medium of any of Examples 25 to 36, the TID acknowledgment limit to comprise a non-STA-specific limit.

Example 39 is the at least one non-transitory computer-readable storage medium of any of Examples 25 to 38, comprising instructions that, in response to being executed at the wireless communication device, cause the wireless communication device to set the respective acknowledgment policy field of each of the one or more selected A-MPDUs to a value of '01' to indicate that immediate acknowledgment is requested.

Example 40 is the at least one non-transitory computer-readable storage medium of any of Examples 25 to 39, the set of A-MPDUs to include a first A-MPDU comprising a first aggregated plurality of MAC service data units (MSDUs) associated with a TID, and a second A-MPDU comprising a second aggregated plurality of MSDUs associated with the TID.

Example 41 is the at least one non-transitory computer-readable storage medium of Example 40, an acknowledgment policy field for the first A-MPDU to be set to a same value as an acknowledgment policy field for the second A-MPDU.

Example 42 is the at least one non-transitory computer-readable storage medium of any of Examples 40 to 41, the first and second A-MPDUs to comprise consecutive A-MPDUs.

Example 43 is the at least one non-transitory computer-readable storage medium of any of Examples 40 to 41, the first and second A-MPDUs to comprise non-consecutive A-MPDUs.

Example 44 is the at least one non-transitory computer-readable storage medium of any of Examples 25 to 43, the UL transmission interval to comprise a portion of a transmit opportunity (TXOP) owned by the AP.

Example 45 is the at least one non-transitory computer-readable storage medium of any of Examples 25 to 44, comprising instructions that, in response to being executed at the wireless communication device, cause the wireless communication device to encapsulate the set of A-MPDUs in a physical layer convergence protocol (PLCP) protocol data unit (PPDU) for transmission to the AP.

Example 46 is a method, comprising identifying, by circuitry of a wireless communication device, a traffic identifier (TID) acknowledgment limit based on an indication received from an access point (AP), generating a set of aggregate medium access control (MAC) protocol data units (A-MPDUs) for transmission to the AP during an uplink (UL) transmission interval, selecting, from among the set of A-MPDUs, one or more A-MPDUs for which to request immediate acknowledgment, the one or more selected A-MPDUs collectively associated with a number of TIDs that does not exceed the TID acknowledgment limit, and setting a respective acknowledgment policy field of each of the one or more selected A-MPDUs to indicate that immediate acknowledgment is requested.

Example 47 is the method of Example 46, the UL transmission interval to comprise a UL multi-user (MU) transmission interval.

Example 48 is the method of any of Examples 46 to 47, the indication comprised in a broadcast transmission received from the AP.

Example 49 is the method of Example 48, the broadcast transmission to comprise a beacon frame.

Example 50 is the method of Example 48, the broadcast transmission to comprise a management frame.

Example 51 is the method of any of Examples 46 to 47, the indication comprised in a Probe Response frame received from the AP.

Example 52 is the method of any of Examples 46 to 47, the indication comprised in an allocation message received from the AP.

Example 53 is the method of Example 52, the allocation message to comprise a Trigger frame.

Example 54 is the method of Example 53, comprising generating the set of A-MPDUs for transmission to the AP in response to receipt of the Trigger frame.

Example 55 is the method of any of Examples 52 to 54, the allocation message to indicate an allocation of resources to the STA for UL transmissions during the UL transmission interval.

Example 56 is the method of any of Examples 52 to 55, the allocation message to indicate respective allocations of resources for UL transmissions of each of a plurality of STAs during the UL transmission interval.

Example 57 is the method of any of Examples 46 to 56, comprising initiating a negotiation procedure to negotiate the TID acknowledgement limit with the AP, and receiving the indication from the AP during the negotiation procedure.

Example 58 is the method of any of Examples 46 to 57, the TID acknowledgment limit to comprise a STA-specific limit.

Example 59 is the method of any of Examples 46 to 57, the TID acknowledgment limit to comprise a non-STA-specific limit.

Example 60 is the method of any of Examples 46 to 59, comprising setting the respective acknowledgment policy field of each of the one or more selected A-MPDUs to a value of '01' to indicate that immediate acknowledgment is requested.

Example 61 is the method of any of Examples 46 to 60, the set of A-MPDUs to include a first A-MPDU comprising a first aggregated plurality of MAC service data units (MSDUs) associated with a TID, and a second A-MPDU comprising a second aggregated plurality of MSDUs associated with the TID.

Example 62 is the method of Example 61, an acknowledgment policy field for the first A-MPDU to be set to a same value as an acknowledgment policy field for the second A-MPDU.

Example 63 is the method of any of Examples 61 to 62, the first and second A-MPDUs to comprise consecutive A-MPDUs.

Example 64 is the method of any of Examples 61 to 62, the first and second A-MPDUs to comprise non-consecutive A-MPDUs.

Example 65 is the method of any of Examples 46 to 64, the UL transmission interval to comprise a portion of a transmit opportunity (TXOP) owned by the AP.

Example 66 is the method of any of Examples 46 to 65, comprising encapsulating the set of A-MPDUs in a physical layer convergence protocol (PLCP) protocol data unit (PPDU) for transmission to the AP.

Example 67 is at least one non-transitory computer-readable storage medium comprising a set of instructions that, in response to being executed on a computing device, cause the computing device to perform a method according to any of Examples 46 to 66.

Example 68 is an apparatus, comprising means for performing a method according to any of Examples 46 to 66.

Example 69 is a system, comprising the apparatus of Example 68, and at least one radio frequency (RF) transceiver.

Example 70 is the system of Example 69, comprising at least one processor.

Example 71 is the system of any of Examples 69 to 70, comprising at least one RF antenna.

Example 72 is an apparatus, comprising means for identifying, at a wireless communication device, a traffic identifier (TID) acknowledgment limit based on an indication received from an access point (AP), means for generating a set of aggregate medium access control (MAC) protocol data units (A-MPDUs) for transmission to the AP during an uplink (UL) transmission interval, means for selecting, from among the set of A-MPDUs, one or more A-MPDUs for which to request immediate acknowledgment, the one or more selected A-MPDUs collectively associated with a number of TIDs that does not exceed the TID acknowledgment limit, and means for setting a respective acknowledgment policy field of each of the one or more selected A-MPDUs to indicate that immediate acknowledgment is requested.

Example 73 is the apparatus of Example 72, the UL transmission interval to comprise a UL multi-user (MU) transmission interval.

Example 74 is the apparatus of any of Examples 72 to 73, the indication comprised in a broadcast transmission received from the AP.

Example 75 is the apparatus of Example 74, the broadcast transmission to comprise a beacon frame.

Example 76 is the apparatus of Example 74, the broadcast transmission to comprise a management frame.

Example 77 is the apparatus of any of Examples 72 to 73, the indication comprised in a Probe Response frame received from the AP.

Example 78 is the apparatus of any of Examples 72 to 73, the indication comprised in an allocation message received from the AP.

Example 79 is the apparatus of Example 78, the allocation message to comprise a Trigger frame.

Example 80 is the apparatus of Example 79, comprising means for generating the set of A-MPDUs for transmission to the AP in response to receipt of the Trigger frame.

Example 81 is the apparatus of any of Examples 78 to 80, the allocation message to indicate an allocation of resources to the STA for UL transmissions during the UL transmission interval.

Example 82 is the apparatus of any of Examples 78 to 81, the allocation message to indicate respective allocations of resources for UL transmissions of each of a plurality of STAs during the UL transmission interval.

Example 83 is the apparatus of any of Examples 72 to 82, comprising means for initiating a negotiation procedure to negotiate the TID acknowledgement limit with the AP, and means for receiving the indication from the AP during the negotiation procedure.

Example 84 is the apparatus of any of Examples 72 to 83, the TID acknowledgment limit to comprise a STA-specific limit.

Example 85 is the apparatus of any of Examples 72 to 83, the TID acknowledgment limit to comprise a non-STA-specific limit.

Example 86 is the apparatus of any of Examples 72 to 85, comprising means for setting the respective acknowledgment policy field of each of the one or more selected A-MPDUs to a value of '01' to indicate that immediate acknowledgment is requested.

Example 87 is the apparatus of any of Examples 72 to 86, the set of A-MPDUs to include a first A-MPDU comprising a first aggregated plurality of MAC service data units (MSDUs) associated with a TID, and a second A-MPDU comprising a second aggregated plurality of MSDUs associated with the TID.

Example 88 is the apparatus of Example 87, an acknowledgment policy field for the first A-MPDU to be set to a same value as an acknowledgment policy field for the second A-MPDU.

Example 89 is the apparatus of any of Examples 87 to 88, the first and second A-MPDUs to comprise consecutive A-MPDUs.

Example 90 is the apparatus of any of Examples 87 to 88, the first and second A-MPDUs to comprise non-consecutive A-MPDUs.

Example 91 is the apparatus of any of Examples 72 to 90, the UL transmission interval to comprise a portion of a transmit opportunity (TXOP) owned by the AP.

Example 92 is the apparatus of any of Examples 72 to 91, comprising means for encapsulating the set of A-MPDUs in a physical layer convergence protocol (PLCP) protocol data unit (PPDU) for transmission to the AP.

Example 93 is a system, comprising an apparatus according to any of Examples 72 to 92, and at least one radio frequency (RF) transceiver.

Example 94 is the system of Example 93, comprising at least one processor.

Example 95 is the system of any of Examples 93 to 94, comprising at least one RF antenna.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a memory; and
   logic for a station (STA), at least a portion of the logic comprised in circuitry coupled to the memory, the logic to:
   receive a frame comprising two or more traffic identifier (TID) acknowledgment limits from an access point (AP);
   identify, from the frame, a TID acknowledgment limit for the STA from the two or more TID acknowledgment limits in the frame, wherein the TID acknowledgment limit indicates a number of TIDs that can be aggregated by the STA in a block acknowledgement for an aggregate medium access control (MAC) protocol data unit (A-MPDU) for which the STA can request immediate acknowledgment;
   generate a set of A-MPDUs for transmission to the AP during an uplink (UL) transmission interval in response to the frame;
   select, from among the set of A-MPDUs, one or more A-MPDUs for which to request immediate acknowledgment, the one or more selected A-MPDUs collectively associated with a number of TIDs that does not exceed the TID acknowledgment limit; and
   set a respective acknowledgment policy field of each of the one or more selected A-MPDUs to indicate that immediate acknowledgment is requested.

2. The apparatus of claim 1, further comprising communication of a subsequent indication of the TID acknowledgement limit in a beacon frame received from the AP.

3. The apparatus of claim 1, further comprising communication of a subsequent indication of the TID acknowledgment limit in a management frame received from the AP.

4. The apparatus of claim 1, further comprising communication of a subsequent indication of the TID acknowledgment limit in a Probe Response frame received from the AP.

5. The apparatus of claim 1, the TID acknowledgment limit to comprise a STA-specific limit.

6. The apparatus of claim 1, the TID acknowledgment limit to comprise a non-STA-specific limit.

7. The apparatus of claim 1, comprising at least one radio frequency (RF) transceiver.

8. At least one non-transitory computer-readable storage medium comprising a set of instructions that, in response to being executed by a processor of a station (STA), cause the processor to perform operations, the operations to:
   receive a frame comprising two or more traffic identifier (TID) acknowledgment limits from an access point (AP);
   identify, from the frame, a TID acknowledgment limit for the STA from the two or more TID acknowledgment limits in the frame, wherein the TID acknowledgment limit indicates a number of TIDs that can be aggregated by the STA in a block acknowledgment for an aggregate medium access control (MAC) protocol data unit (A-MPDU) for which the STA can request immediate acknowledgment;
   generate a set of A-MPDUs for transmission to the AP during an uplink (UL) transmission interval in response to the frame;
   select, from among the set of A-MPDUs, one or more A-MPDUs for which to request immediate acknowledgment, the one or more selected A-MPDUs collectively associated with a number of TIDs that does not exceed the TID acknowledgment limit; and
   set a respective acknowledgment policy field of each of the one or more selected A-MPDUs to indicate that immediate acknowledgment is requested.

9. The at least one non-transitory computer-readable storage medium of claim 8, wherein the operations further comprise communication of a subsequent indication of the TID acknowledgment limit in a beacon frame received from the AP.

10. The at least one non-transitory computer-readable storage medium of claim 8, wherein the operations further comprise communication of a subsequent indication of the TID acknowledgment limit in a management frame received from the AP.

11. The at least one non-transitory computer-readable storage medium of claim 8, wherein the operations further comprise communication of a subsequent indication of the TID acknowledgment limit in a Probe Response frame received from the AP.

12. The at least one non-transitory computer-readable storage medium of claim 8, the TID acknowledgment limit to comprise a STA-specific limit.

13. The at least one non-transitory computer-readable storage medium of claim 8, the TID acknowledgment limit to comprise a non-STA-specific limit.

14. A method, comprising:
   receiving a frame comprising two or more traffic identifier (TID) acknowledgment limits from an access point (AP);
   identify, from the frame, a TID acknowledgment limit for the STA from the two or more TID acknowledgment limits in the frame, wherein the TID acknowledgment limit indicates a number of TIDs that can be aggregated by the STA in a block acknowledgment for an aggregate medium access control (MAC) protocol data unit (A-MPDU) for which the STA can request immediate acknowledgment;

generating a set of A-MPDUs for transmission to the AP during an uplink (UL) transmission interval in response to the frame;

selecting, from among the set of A-MPDUs, one or more A-MPDUs for which to request immediate acknowledgment, the one or more selected A-MPDUs collectively associated with a number of TIDs that does not exceed the TID acknowledgment limit; and setting a respective acknowledgment policy field of each of the one or more selected A-MPDUs to indicate that immediate acknowledgment is requested.

15. The method of claim 14, further comprising communication of a subsequent indication of the TID acknowledgment limit in a beacon frame received from the AP.

16. The method of claim 14, further comprising communication of a subsequent indication of the TID acknowledgment limit in a management frame received from the AP.

17. The method of claim 14, further comprising communication of a subsequent indication of the TID acknowledgment limit in a Probe Response frame received from the AP.

18. The method of claim 14, the TID acknowledgment limit to comprise a STA-specific limit.

19. The method of claim 14, the TID acknowledgment limit to comprise a non-STA-specific limit.

* * * * *